(12) United States Patent
Jefremov et al.

(10) Patent No.: US 9,699,099 B2
(45) Date of Patent: Jul. 4, 2017

(54) METHOD OF TRANSMITTING DATA IN A COMMUNICATION SYSTEM

(75) Inventors: Andrei Jefremov, Jarfalla (SE); Karlheinz Wurm, Tallinn (EE)

(73) Assignee: Skype, Dublin (IE)

( * ) Notice: Subject to any disclaimer, the term of this patent is extended or adjusted under 35 U.S.C. 154(b) by 0 days.

(21) Appl. No.: 12/402,161

(22) Filed: Mar. 11, 2009

(65) Prior Publication Data

US 2009/0234919 A1    Sep. 17, 2009

(30) Foreign Application Priority Data

Mar. 12, 2008  (WO) .................. PCT/IB2008/001353
Oct. 2, 2008   (GB) .................................. 0819389.8

(51) Int. Cl.

| | | |
|---|---|---|
| G06F 15/16 | (2006.01) | |
| H04L 12/825 | (2013.01) | |
| H04L 12/801 | (2013.01) | |
| H04L 12/815 | (2013.01) | |
| H04L 12/811 | (2013.01) | |
| H04L 12/26 | (2006.01) | |

(52) U.S. Cl.
CPC .......... H04L 47/26 (2013.01); H04L 43/0894 (2013.01); H04L 47/10 (2013.01); H04L 47/22 (2013.01); H04L 47/263 (2013.01); H04L 47/38 (2013.01); *H04L 43/0858* (2013.01)

(58) Field of Classification Search
CPC .......... H04L 29/0604; H04L 29/06176; H04L 47/26; H04L 43/0858; H04L 43/0894; H04L 47/10; H04L 47/22; H04L 47/263; H04L 47/38; H04N 7/147; H04N 7/148

USPC ......................................................... 709/246
See application file for complete search history.

(56) References Cited

U.S. PATENT DOCUMENTS

| | | | | |
|---|---|---|---|---|
| 5,463,422 A | * | 10/1995 | Simpson ............... | G09G 5/393 348/390.1 |
| 5,687,095 A | | 11/1997 | Haskell et al. | |
| 5,768,527 A | | 6/1998 | Zhu et al. | |

(Continued)

FOREIGN PATENT DOCUMENTS

| | | |
|---|---|---|
| CN | 101658000 | 2/2010 |
| EP | 1 463 323 A1 | 9/2004 |

(Continued)

OTHER PUBLICATIONS

International Search Report, PCT/EP2009/052916, mailing date: Sep. 10, 2009.

(Continued)

*Primary Examiner* — Christopher Biagini

(57) ABSTRACT

A method of transmitting image data from a first node to a second node during a communication event, wherein the second node comprises a display for displaying image data at the second node, includes receiving at the first node, information indicating at least one display characteristic with which image data received at the second node will be displayed on the display; inputting image data at the first node; determining a processing step to be applied to the inputted image data to generate adapted image data, such that at least one characteristic of the adapted image data is optimized for the at least one display characteristic; applying the processing step to generate the adapted image data; and transmitting the adapted image data to the second terminal.

20 Claims, 7 Drawing Sheets

(56) References Cited

U.S. PATENT DOCUMENTS

| | | |
|---|---|---|
| 5,838,664 A | 11/1998 | Polomski |
| 6,067,534 A | 5/2000 | Terho et al. |
| 6,141,565 A | 10/2000 | Feuerstein et al. |
| 6,175,856 B1* | 1/2001 | Riddle .......................... 709/204 |
| 6,356,283 B1* | 3/2002 | Guedalia ...................... 715/760 |
| 6,748,220 B1 | 6/2004 | Chow et al. |
| 7,047,305 B1* | 5/2006 | Brooks et al. ................ 709/231 |
| 7,587,454 B2 | 9/2009 | Shabtai et al. |
| 7,817,625 B2 | 10/2010 | Jefremov |
| 7,898,950 B2 | 3/2011 | Barkley et al. |
| 7,925,721 B2 | 4/2011 | Ro et al. |
| 7,948,886 B2 | 5/2011 | Chakareski et al. |
| 8,018,850 B2 | 9/2011 | van Beek et al. |
| 8,059,634 B1 | 11/2011 | Evans |
| 8,289,370 B2 | 10/2012 | Civanlar et al. |
| 9,509,618 B2 | 11/2016 | Jefremov |
| 2002/0073238 A1* | 6/2002 | Doron .......................... 709/246 |
| 2002/0136164 A1 | 9/2002 | Fukuda et al. |
| 2002/0141392 A1 | 10/2002 | Tezuka et al. |
| 2002/0165966 A1 | 11/2002 | Widegren et al. |
| 2003/0152032 A1 | 8/2003 | Yanagihara et al. |
| 2003/0236833 A1 | 12/2003 | Glitho et al. |
| 2003/0236892 A1* | 12/2003 | Coulombe .................... 709/228 |
| 2004/0032485 A1 | 2/2004 | Stephens, Jr. |
| 2004/0107245 A1* | 6/2004 | Bodnar ......................... 709/203 |
| 2004/0113933 A1* | 6/2004 | Guler ........................... 345/716 |
| 2004/0133701 A1* | 7/2004 | Karaoguz et al. ............ 709/246 |
| 2004/0203976 A1 | 10/2004 | Gupta et al. |
| 2004/0253991 A1* | 12/2004 | Azuma ......................... 455/566 |
| 2004/0264803 A1 | 12/2004 | Castillo |
| 2004/0266442 A1 | 12/2004 | Flanagan et al. |
| 2005/0018768 A1 | 1/2005 | Mabey et al. |
| 2005/0073575 A1* | 4/2005 | Thacher et al. ........... 348/14.13 |
| 2005/0273491 A1* | 12/2005 | Meyer et al. ................ 709/203 |
| 2006/0064647 A1* | 3/2006 | Tapuska et al. .............. 715/800 |
| 2006/0079209 A1 | 4/2006 | Oda |
| 2006/0139371 A1* | 6/2006 | Lavine ..................... G06F 3/14 345/620 |
| 2006/0146711 A1 | 7/2006 | Anbarani |
| 2006/0227781 A1 | 10/2006 | Marce et al. |
| 2007/0002840 A1 | 1/2007 | Song et al. |
| 2007/0019587 A1 | 1/2007 | Okamoto et al. |
| 2007/0027983 A1 | 2/2007 | Bowra et al. |
| 2007/0174489 A1* | 7/2007 | Iwabuchi ...................... 709/246 |
| 2007/0174881 A1 | 7/2007 | Idehara et al. |
| 2007/0206591 A1 | 9/2007 | Doviak et al. |
| 2007/0206635 A1 | 9/2007 | Pozhenko et al. |
| 2007/0271358 A1* | 11/2007 | Gaddy .......................... 709/222 |
| 2008/0068446 A1* | 3/2008 | Barkley et al. ............ 348/14.07 |
| 2008/0165895 A1* | 7/2008 | Lesser et al. ................ 375/316 |
| 2008/0225750 A1 | 9/2008 | Jefremov |
| 2008/0225844 A1 | 9/2008 | Jefremov |
| 2008/0298444 A1 | 12/2008 | Cioffi et al. |
| 2009/0234919 A1 | 9/2009 | Jefremov et al. |
| 2009/0310487 A1 | 12/2009 | Eriksson |
| 2011/0122869 A1 | 5/2011 | Jefremov |
| 2012/0033586 A1 | 2/2012 | Jefremov |

FOREIGN PATENT DOCUMENTS

| | | |
|---|---|---|
| EP | 2272237 | 1/2012 |
| EP | 2445168 | 4/2012 |
| GB | 2405768 | 9/2005 |
| JP | 11215481 | 8/1999 |
| JP | 2010521856 | 6/2010 |
| WO | WO 97/22201 A | 6/1997 |
| WO | WO 2005/002261 A1 | 1/2005 |
| WO | WO 2005/009019 A2 | 1/2005 |
| WO | WO 2008/027724 A1 | 3/2008 |
| WO | WO-2008110871 | 9/2008 |
| WO | WO-2008110930 | 9/2008 |
| WO | WO-2009112547 | 9/2009 |

OTHER PUBLICATIONS

Written Opinion of the International Searching Authority, PCT/EP2009/052916, mailing date: Sep. 10, 2009.

International Search Report and Written Opinion for International Application No. PCT/IB2007/004510, date of mailing Sep. 5, 2008.

Sato, J., et al., "Compressed Video Transmission Protocol Considering Dynamic QoS Control," 1998 Proceedings of the 1998 ICPP Workshops on Minneapolis, MN, USA, Aug. 14, 1998, pp. 95-104 (Jan. 1, 1998).

International Search Report, PCT/IB2008/001353, mailing date Sep. 12, 2008.

"Foreign Office Action", CN Application No. 200880008101.6, (Jun. 4, 2012), 7 pages.

"Foreign Office Action", EP Application No. 08751054.1, (Mar. 1, 2012), 6 pages.

"Foreign Office Action", EP Application No. 08751054.1, (Jun. 9, 2010), 7 pages.

"Foreign Office Action", JP Application No. 2009-553236, (Feb. 21, 2012), 7 pages.

"European Search Report", Application No. EP11196071. (Mar. 23, 2012), 7 pages.

"Final Office Action", U.S. Appl. No. 12/004,457, (Mar. 1, 2012), 29 pages.

"Non-Final Office Action", U.S. Appl. No. 12/004,457, (Aug. 1, 2011), 21 pages.

"Non-Final Office Action", U.S. Appl. No. 12/075,801, (Dec. 1, 2009), 13 pages.

"Notice of Allowance", U.S. Appl. No. 12/075,801, (Jun. 22, 2010), 7 pages.

"Written Opinion", Application No. PCT/IB2008/001353, (Sep. 12, 2008), 8 pages.

"Non-Final Office Action", U.S. Appl. No. 13/022,478, (Apr. 8, 2013),14 pages.

"Foreign Office Action", CN Application No. 200880008101.6, Mar. 28, 2014, 14 pages.

"Non-Final Office Action", U.S. Appl. No. 13/022,478, May 28, 2014, 39 pages.

"Reexamination Decision", CN Application No. 200880008101.6, Dec. 4, 2014, 18 pages.

"Final Office Action", U.S. Appl. No. 13/022,478, Dec. 31, 2014, 38 pages.

"Final Office Action", U.S. Appl. No. 13/022,478, Nov. 7, 2013, 33 pages.

"Non-Final Office Action", U.S. Appl. No. 12/004,457, Aug. 27, 2014, 32 pages.

"Final Office Action", U.S. Appl. No. 12/004,457, Apr. 1, 2015, 32 pages.

"Non-Final Office Action", U.S. Appl. No. 12/004,457, May 12, 2016, 31 pages.

"Non-Final Office Action", U.S. Appl. No. 13/022,478, Apr. 20, 2016, 9 pages.

"Final Office Action", U.S. Appl. No. 12/004,457, Jan. 11, 2017, 33 pages.

"Notice of Allowance", U.S. Appl. No. 13/022,478, Aug. 16, 2016, 5 pages.

\* cited by examiner

METHOD OF TRANSMITTING DATA IN A COMMUNICATION SYSTEM

RELATED APPLICATIONS

This application claims priority under 35 U.S.C. §119 or 365 to Great Britain Application No. 0819389.8, filed Oct. 22, 2008 and PCT/IB08/001353, filed Mar. 12, 2008. The entire teachings of the above applications are incorporated herein by reference.

FIELD OF THE INVENTION

The present invention relates to a method and system for transmitting and receiving data in a communication system. More particularly, the present invention relates to a method and apparatus for transmitting and receiving image data to be output to a user on a display.

BACKGROUND OF THE INVENTION

In a communication system a communication network is provided, which can link together at least two communication terminals so that the terminals can send information to each other in a call or other communication event. Information may include speech, text, images or video.

Digital communication systems are based on the transmission of digital signals. Analogue signals such as light waves are input into a recording device such as a camera and recorded by an image sensor such as a charged coupled device (CCD) in the camera. Data recorded by the image sensor is then converted into digital data by an analogue to digital converter. The digital signal is then encoded and placed into data packets for transmission over a communication network.

Each data packet includes a header portion and a payload portion. The header portion of the data packet contains data for transmitting and processing the data packet. This information may include an identification number and source address that uniquely identifies the packet, a header checksum used to detect processing errors and the destination address. The payload portion of the data packet includes the encoded video data intended for transmission.

The transmission of high quality images, such as those with a high resolution, may require large amounts of data to be encoded and transmitted via the communication network, particularly during real time communication events such as video calls and video streaming. This consumes a large amount of CPU (Central Processing Unit) resource of the transmitting terminal and of the receiving terminal which in turn increases the power consumption of the terminals. The transmission of large amounts of data will also consume the bandwidth of network, thereby increasing introducing packet loss and delay.

The transmission of high quality images may require complex compression methods to encode the data, such encoding methods may again consume a large amount of CPU resource.

A further problem with transmitting high quality images is that this can overload the CPU resources of the terminals thereby adversely affecting the operation of the terminal to display the image and perform other processing functions.

The burden on the CPU resources of the terminals may be alleviated by sending data at a low resolution. However this can also adversely affect the quality of the displayed image. This is particularly noticeable to a user when the display screen on which the image is displayed is large and has a high resolution.

It is therefore an aim of the present invention to overcome the above identified problems by efficiently encoding and transmitting information over the network without affecting the perceived quality of the image displayed at the receiving terminal.

It is a further aim of the invention to improve the perceived quality of the image data when it is displayed at a receiving terminal.

SUMMARY OF THE INVENTION

According to a first aspect of the present invention there is provided a method of transmitting image data from a first node to a second node during a communication event, wherein the second node comprises a display for displaying image data at the second node, said method comprising;
   receiving at the first node, information indicating at least one display characteristic with which image data received at the second node will be displayed on said display;
   inputting image data at the first node;
   determining a processing step to be applied to the inputted image data to generate adapted image data, such that at least one characteristic of the adapted image data is optimised for said at least one display characteristic;
   applying the processing step to generate the adapted image data; and
   transmitting the adapted image data to the second terminal.

According to a second aspect of the present invention there is provided a method of transmitting image data from a first node to a second node during a communication event, wherein the second node comprises a display for displaying image data at the second node, said method comprising;
   receiving at the first node, information indicating at least one display characteristic with which image data received at the second node will be displayed on said display; inputting image data at the first node;
   determining a processing step to be applied to the inputted image data to generate adapted image data, such that an acceptable quality threshold is met when the adapted image data is displayed with the display characteristic;
   applying the processing step to generate the adapted image data; and
   transmitting the adapted image data to the second terminal, According to a third aspect of the invention there is provided a transmitting terminal arranged to transmit image data to a receiving terminal during a communication event, wherein the receiving terminal comprises a display for displaying image data, said transmitting terminal comprising:
   a receiver for receiving information indicating at least one display characteristic with which image data received at the receiving terminal will be displayed on said display;
   an image inputting system for inputting image data at the transmitting terminal; a control block for determining a processing step to be applied to the inputted image data to generate adapted image data, such that at least one characteristic of the adapted image data is optimised for said at least one display characteristic;
   a processing block for applying the processing step to generate the adapted image data; and a transmitter for transmitting the adapted image data to the second terminal.

According to a fourth aspect of the present invention there is provided a receiving terminal for receiving image data transmitted from a transmitting terminal during a communication event, said receiving terminal comprising:

a display for displaying image data received by the receiving terminal, a display reporter unit arranged to determine information indicating a display characteristic with which image data received at the second node will be displayed on said display; and a transmitter for transmitting said information indicating said display characteristic to the transmitting terminal, such that the transmitting terminal may adapt the image data to be transmitted to the receiving terminal in order to optimise at least one characteristic of the image for said at least one display characteristic.

One advantage of embodiments of the present invention is that the resolution of the image may be adapted to increase only when this is necessary to maintain an acceptable level of quality of the displayed image.

Furthermore the data in the encoded image may be optimised according to the manner in which it is displayed at the receiving terminal.

BRIEF DESCRIPTION OF DRAWINGS

For a better understanding of the present invention and to show how the same may be carried into effect, embodiments of the present invention will now be described with reference to the following drawings.

DETAILED DESCRIPTION OF THE INVENTION

Figure 1:
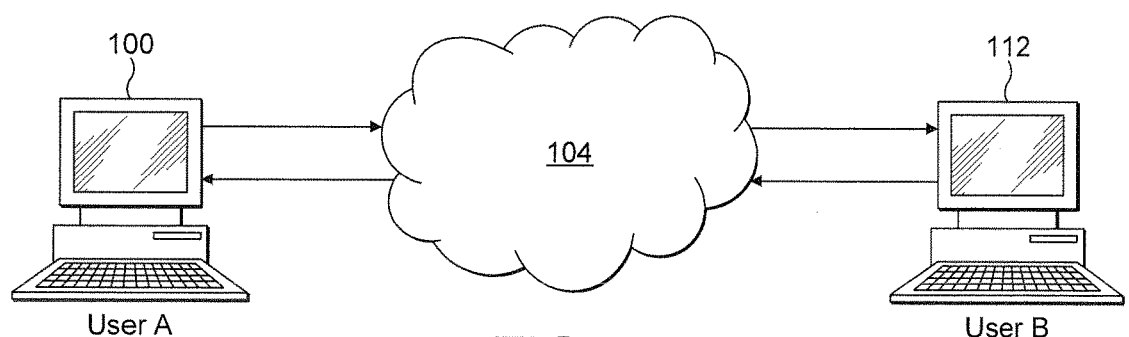
FIG. 1 shows a communication network.

FIG. 1 shows a first node 100 and a second node 112 connected to a communication network 104. In the described embodiment, the first node 100 is a first user terminal operated by User A, and the second node 112 is a second user terminal 112 is operated by User B. In an alternative embodiment the first node 100 may be a server arranged to provide media content to the user terminal 112. In one embodiment of the invention the communication network 104 is the internet.

The user terminals 100, 112, may be a personal computer, a gaming device, a personal digital assistant, a suitably enabled mobile phone, a television, or another device able to output image data on an integrated or peripheral display. The terminals may be connected to the network via a wired or wireless connection that employs a particular access technology such as Ethernet, WiFi, WiMax (Worldwide Interoperability for Microwave Access), or 3G (third generation).

A communication event, such as a video call, may be set up between the first user terminal 100 and the second user terminal 112. During the video call, video data is transmitted between the user terminals via the communication network 104.

Figure 2:
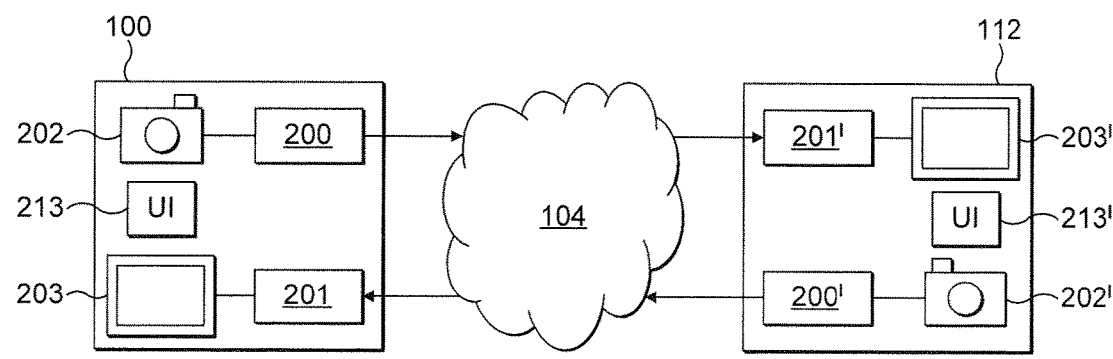
FIG. 2 shows a first user terminal and a second user terminal in more detail.

Reference will now be made to FIG. 2. FIG. 2 shows the first user terminal 100 and the second user terminal in more detail. The first user terminal 100 comprises: an image input system 202 for capturing image data; transmitting circuitry 200 for transmitting the image data via the network 104; receiving circuitry 201 for receiving image data from the network 104; a display screen 203 for displaying the image data and a user interface (UI) device 213 for receiving an input from User A. Similarly the second user terminal contains transmitting circuitry 200', receiving circuitry 201', an image input system 202', a display screen 203' and a UI device 213'.

The following description will describe the transmission of image data from the first user terminal 100 to the second user terminal 112. However it should be readily appreciated that the second user terminal may also be arranged to transmit image data to the first user terminal in accordance with the method described below.

The transmitting circuitry of first user terminal 100 is arranged to receive image data from the image input system 202 and to transmit the image data to the second user terminal 112.

In a preferred embodiment of the invention the image input system 202, 202' is a video camera. Video data is transmitted from the first user terminal 100 to the second user terminal 112, via the network 104. The receiving circuitry 201' of the second user terminal 112 is arranged to receive the video data from the network 104 and to output the video data on the display screen 203.

Figure 3:
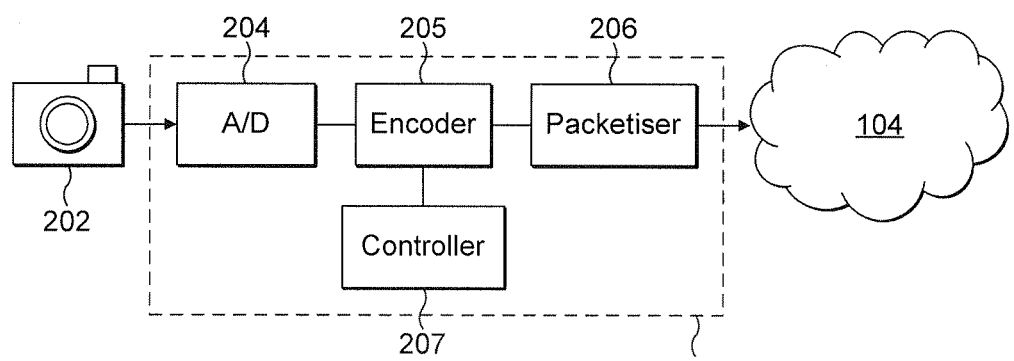
FIG. 3 shows transmitting circuitry of a user terminal in accordance with an embodiment of the invention.

FIG. 3 shows the transmitting circuitry 200, 200' in more detail. The transmitting circuitry comprises an analogue to digital converter 204, an encoder 205, a packetiser 206 and a control block 207.

Figure 4:
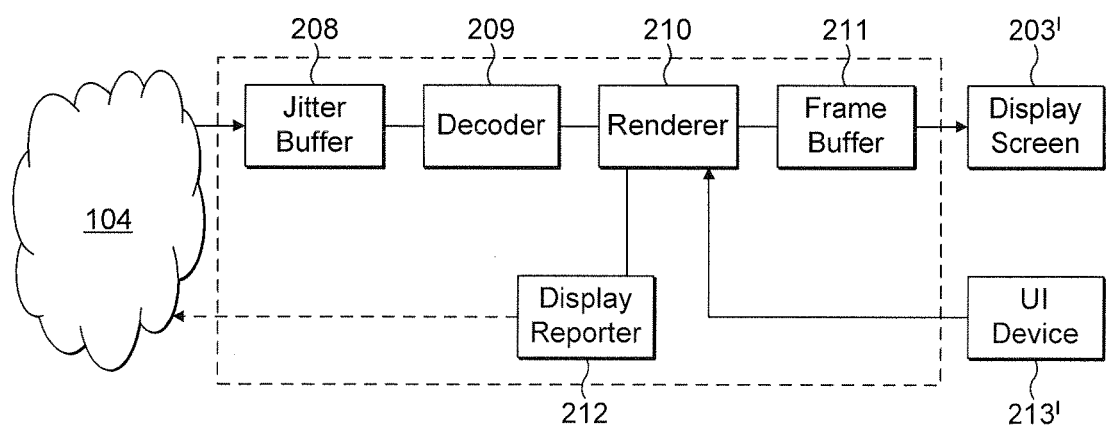
FIG. 4 shows receiving circuitry of a user terminal in accordance with an embodiment of the invention.

FIG. 4 shows the receiving circuitry 201, 201' in more detail. The receiving circuitry comprises a jitter buffer 208, a decoder 209, a renderer 210, a display reporter unit 212 and a frame buffer 211.

The analogue to digital converter 204 in the first user terminal 100, receives an analogue representation of an image captured by an image sensor of the video camera 202. The analogue to digital converter 204 is arranged to convert the image into a digital signal. The digital signal is then encoded by the encoder 205 under the control of the control block 207. The operation of the control block will be described in detail herein after.

The packetiser 206 receives the encoded video data from the encoder 205. and places the encoded video data into data packets. The data packets are then transmitted to the second terminal 112 via the network 104.

Data packets received at the second terminal 112 via the communication network are input into the jitter buffer 208. The jitter buffer 208 buffers data packets received from the network 104 and outputs the buffered data packets to the decoder 209. The decoder 209 is arranged to decode the encoded video data and to provide the decoded data to the renderer 210. The renderer is arranged to write information to the frame buffer 211. Video data written into the frame buffer is displayed on the display screen 203.

The inventors of the present invention have found that information relating to the how the image is displayed at the receiving terminal may advantageously be used at the transmitting terminal to control how the image is encoded.

For example, information relating to how the image is displayed may be used to optimise an encoding parameter used to encode the image such that an acceptable level of perceived quality for the image displayed is achieved.

For example the resolution at which the image is encoded may be controlled to be equivalent to the resolution at which the image is displayed at the receiving terminal.

According to exemplary embodiments of the invention, information relating to the manner in which the image data is displayed at the second user terminal 112 is reported by the display reporter unit 212 to the first user terminal 100. The control block 207 at the first user terminal may then control the encoder to adapt the image sent to the second terminal in dependence on the reported manner in which the image data is displayed.

Embodiments described hereinafter refer in general to adapting the resolution of the image sent to the second terminal in dependence on the display information. However it should be appreciated that in further embodiments of the invention the control block may be arranged to adapt, for example, the resolution, the bit rate, the frame rate or the compression complexity of the image data transmitted to the second terminal.

According to one embodiment of the invention, the display reporter unit 212 may be arranged to report the resolution of the display screen 203' of the second terminal 112, to the first terminal 100. In response, the control block of the first terminal may determine the resolution at which the image should be encoded. The controller may determine that if the resolution is above a predetermined threshold the image should be encoded at a high resolution, whereas if the resolution is below a predetermined threshold the image should be encoded at a low resolution.

Figure 5:
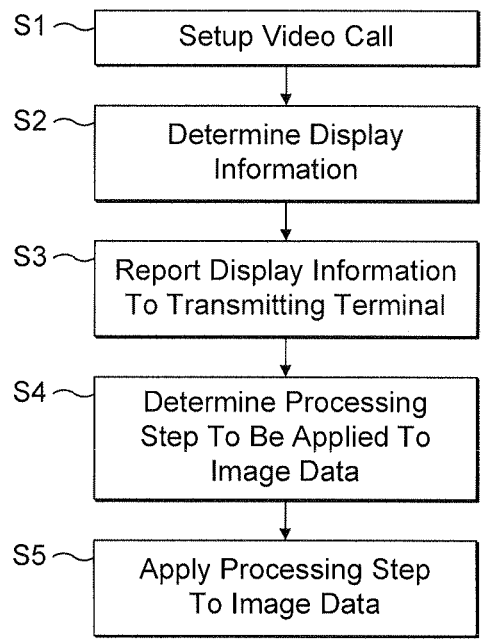
FIG. 5 shows a flowchart according to an embodiment of the invention.

According to a further embodiment of the invention image data may be adapted according to the size of the area in which the image is displayed. This will be exemplified with reference to the flowchart shown in FIG. 5.

In step S1 a communication event such as a video call is set up between the first user terminal and the second user terminal.

Figure 6:
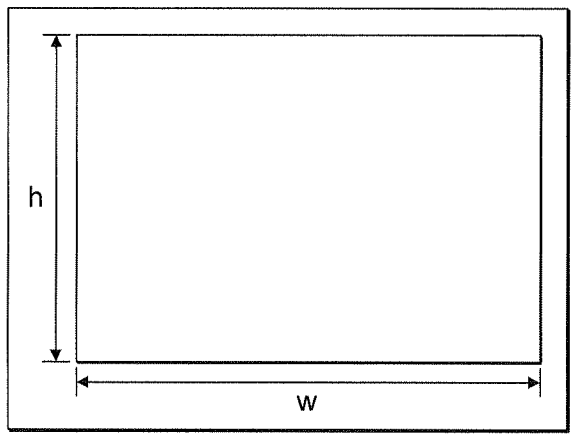
FIG. 6 shows a display screen having dimensions h×w.

In step S2 the display reporter unit 212 in the second terminal is arranged to determine information relating to the manner in which data received from the first user terminal will be displayed, hereinafter referred to as 'display information'. For example the display reporter unit 212 may determine information relating to the dimensions of the display screen 203. In this case the display reporter unit 212 in the second user terminal may be arranged to report the physical height h and the width w of the display screen, as shown in FIG. 6. In a preferred embodiment the display reporter unit 212 is also arranged to determine the resolution of the display screen, The dimensions and resolution of the display screen may be retrieved from a local memory of the second user terminal.

In step S3 the display information is reported from the display reporter unit 212 of the second user terminal, to the first terminal. The display information transmitted from the second terminal may be sent together with video data that is transmitted to the first user terminal from the second user terminal.

In step S4 the display information provided from the second user terminal is provided to the control block 207 of the first user terminal. The control block is arranged to determine the resolution that is appropriate for the manner in which the image data is displayed.

The resolution may be determined using an algorithm that computes the required resolution as a function of the display information.

For example the required resolution of the transmitted image may be calculated according to Equation (1)

$$\text{image resolution} = K(h,w) \times \text{screen resolution} \quad (1)$$

Where the image resolution is the total number of pixels in the image; where the screen resolution is the total number of pixels in the screen and where K is a value between 0 and 1, such that the resolution of the transmitted image does not exceed the resolution of the display. The value of K may approach 1 for larger values of screen height (h) and width (w). K may be derived empirically based on perception quality evaluation testing.

Alternatively the required resolution may be determined by a look up table stored in a memory accessible to the control block. The look up table will define an acceptable transmitted image resolution for a given display resolution and area.

In step S5 the control block is arranged to control the encoder to encode the data at the required resolution. This may be achieved, for example by reducing the frame rate or increasing the bit rate available to the encoder. The maximum resolution that may be applied to the image may be limited to the resolution of the image provided from the video camera.

In an alternative embodiment of the invention the image data may be displayed in a portion of the display screen 203, in a graphical display window, wherein the dimensions of the graphical display window may be controlled by the user of the second user terminal.

As shown in FIG. 4, the renderer block receives an input from the user interface (UI) device 213 of the second terminal to control the size of the window in which the image data is displayed. The UI device of the second terminal may be a keyboard, mouse, touch screen or any other interface means suitable for controlling the dimensions of the display window. This embodiment of the invention is described with reference to the flow chart shown in FIG. 7.

In step S11 a communication event such as a video call is set up between the first terminal and the second terminal.

In step S12 the display reporter unit is arranged to determine the size of the window. This may be determined for example from the renderer 210 or reported from a module used to generate the graphical window (not shown).

In step S13 the display reporter unit is arranged to report the display information to the first user terminal.

In step S14 the reporting module is arranged to monitor the renderer to determine whether the size of the display window has changed since the size of the display window was reported to the first terminal in step S13.

In step S15, if it is determined that the display window has changed size, the reporting module is arranged to transmit updated dimensions of the display window to the first user terminal 100 such that the encoder may be controlled to adapt the resolution at which the image data is encoded.

Figure 7:
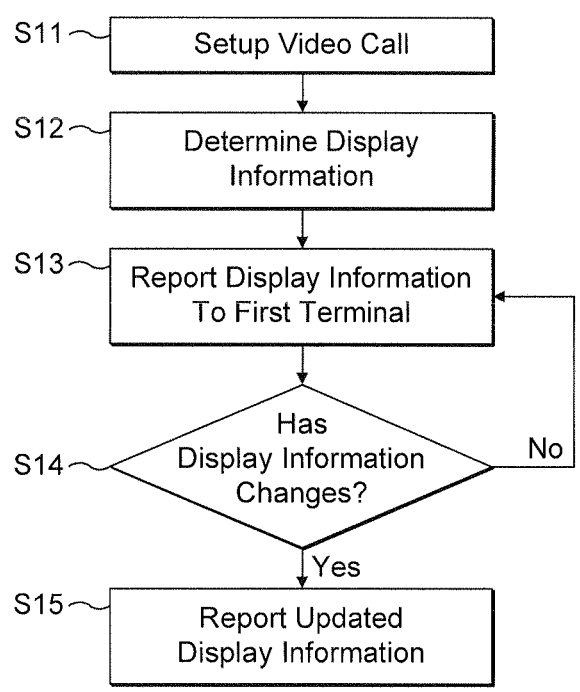
FIG. 7 shows a flowchart according to a further embodiment of the invention.
Figure 8:
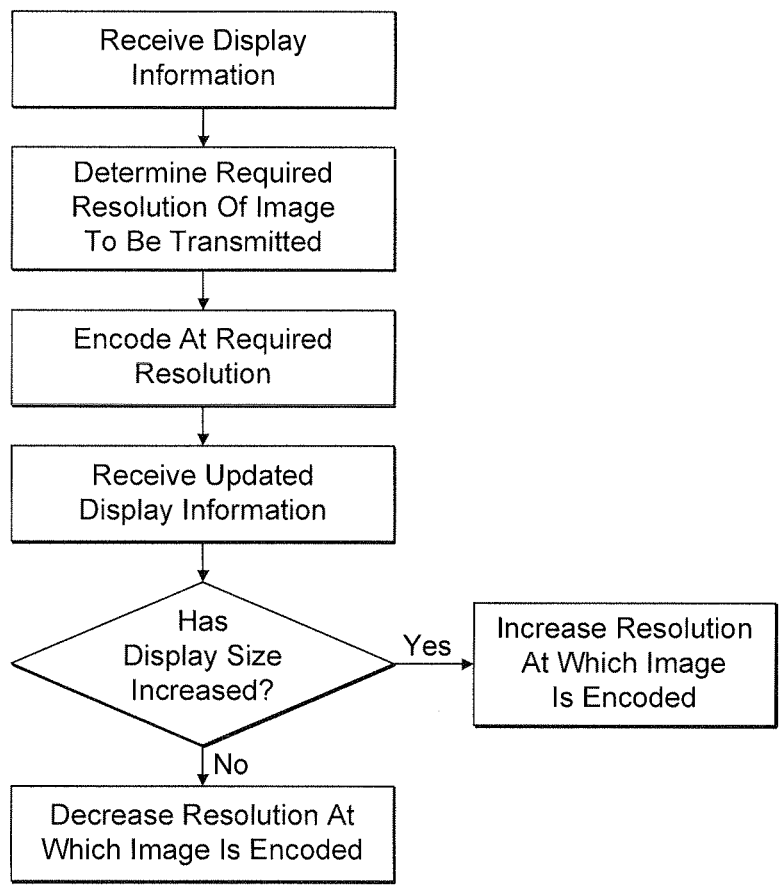
FIG. 8 shows a flowchart according to a further embodiment of the invention.

FIG. 8 shows a flowchart describing the method steps implemented in the receiver in response to receiving display information transmitted according the method described in relation to FIG. 7.

In step S21 the first user terminal receives display information relating to the dimensions of the window in which the image data is to be displayed.

In step S22 the control block is arranged to determine the required resolution of the image to be transmitted, such that an acceptable quality threshold is met when the image is displayed in a window with the reported window dimensions. The required resolution may be determined according to an algorithm or look up table.

In step S23 the control block is arranged to control the encoder to encode the data at the required resolution.

In step S24 the control block receives updated display window dimensions from the second user terminal 112.

In step S25 the control block is arranged to determine if the area of the display window has increased or decreased.

In step S26 if it is determined that the area of the display window has increased, the control block is arranged to control the encoder to increase the resolution at which the image data is encoded.

In step S27, if it is determined that the area of the display window has decreased, the control block is arranged to control the encoder to decrease the resolution at which the image data is encoded.

In one embodiment of the invention, User B of the second terminal may control the proportion of the image displayed in the display window such that User B may zoom in and out of the received image data.

According to an embodiment of the invention the display reporter unit is arranged to report the proportion of the image that is displayed in the display. According to this embodiment of the invention the control block is arranged to determine the magnification applied to the image from the reported display window dimensions and the proportion of the image displayed in the display window, The required resolution is then determined using an algorithm or a look up table. For example, if it is determined that the magnification applied at the renderer to the actual size of the image transmitted is more than 1 the data is encoded with a high resolution. Conversely, if it is determined that the magnification applied to the actual size of the image is less than one the encoder is controlled to encode the image with a lower resolution.

In a further embodiment of the invention, when only a portion of the image is displayed in the graphical display window the display reporter unit 212 is arranged to provide an indication of the location of the portion of the image displayed within the complete image. For example the display reporter unit 212 may be arranged to report coordinates defining the location of the displayed portion of the image. In this case the encoder may be controlled to encode only the identified area at the higher resolution. The remaining portions of the image may be encoded at a lower bit rate or cropped before the image is transmitted, such that the total bit rate required to encode the image is not necessarily increased.

In a further embodiment of the invention the display reporter unit 212 is arranged to report information indicating the colour depth of the screen. This describes the number of bits used to represent colour for one pixel. In response to receiving the colour depth information from the second terminal, the first terminal is arranged to control the encoded image data to be optimised for the reported colour depth. For example if the reported colour depth of the display is high the image may be encoded with a high colour depth, for example wherein more bits are used to represent colour than if the reported colour depth of the screen is low.

In a further embodiment of the invention the display reporter unit 212 is arranged to report information indicating the screens ability to represent light nuances. In response to receiving this information from the second terminal, the first terminal is arranged to control the encoded image data to be optimised for the screens ability to represent light. For example if the screen is able to represent light at a high quality, the image may be encoded to preserve light nuances, wherein for example more bits are used represent levels of light than if the screen is only able to represent light nuances at a lower quality.

Figure 12:
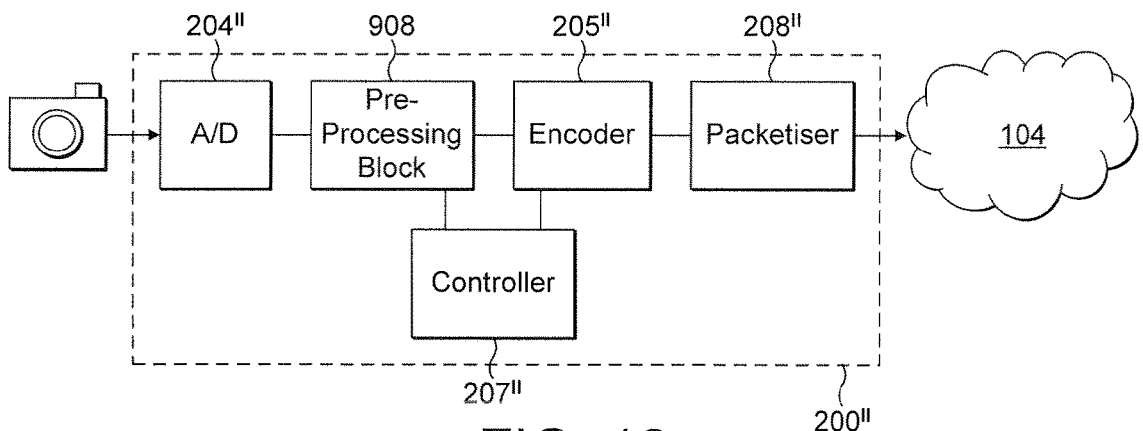
FIG. 12 is a diagram showing transmitting circuitry according to a further embodiment of the invention.

Reference is now made to FIG. 12 which shows the transmitting circuitry of the user terminal according to a further embodiment of the invention. As shown in FIG. 12 the transmitting circuitry 200''' further comprises an adaptation block 908 that is arranged to process the signal before it is input into the encoder.

Figure 13:
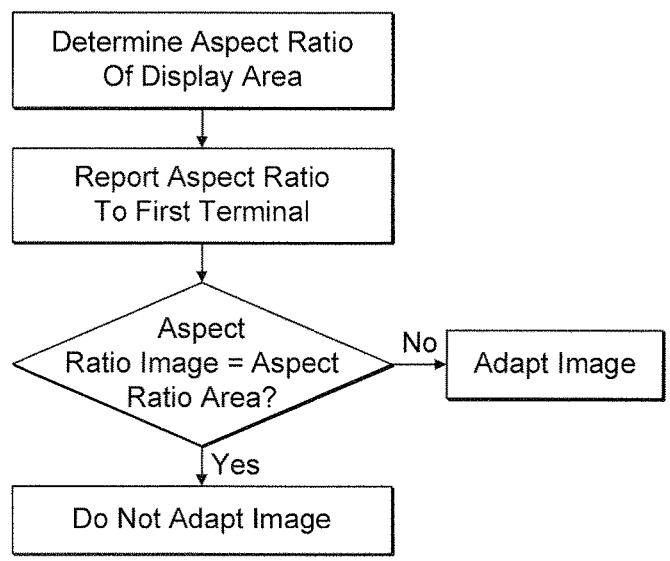
FIG. 13 shows a flowchart according to a further embodiment of the invention.

In one embodiment of the invention the control unit may be arranged to control the adaptation block 908 in response to receiving information relating to the aspect ratio of the window in which the image is displayed at the second terminal. This will be described with reference to the flowchart shown in FIG. 13.

In step S31 the display reporter unit determines the aspect ratio of the area in which the image is displayed. This may be the area of a graphical window selected by a user, or the fixed aspect ratio of the display screen.

In step S32 the display reporter unit is arranged to report the aspect ratio of the display area to the first terminal.

In step S33 the control block is arranged to compare the aspect ratio of the area in which the image will be displayed to the aspect ratio of the image received from the video camera to determine if the aspect ratios are equivalent.

In step S34 if it is determined that the aspect ratio of the image received from the camera is different from the aspect ratio of the display area, the control block is arranged to control the adaptation block 908 to add black areas to the image received from the camera such that the entire image has the same aspect ratio as the reported display area and the image provided from the camera retains its aspect ratio.

Figure 9:
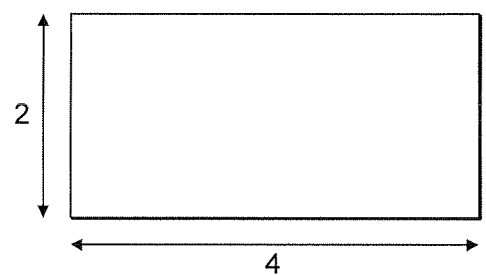
FIG. 9 is a diagram showing the aspect ratio of an image display area.
Figure 10:
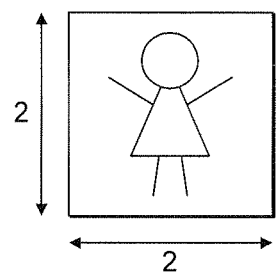
FIG. 10 is a diagram showing the aspect ratio of an image.
Figure 11:
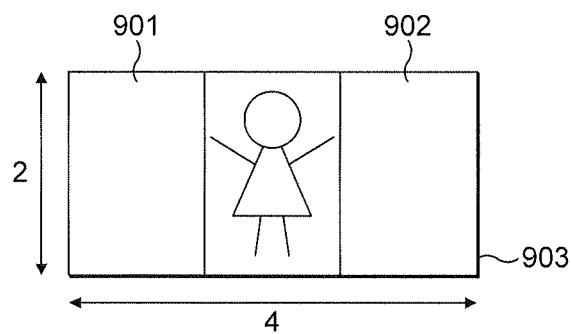
FIG. 11 is a diagram showing the aspect ratio of an encoded image.

For example if the aspect ratio of the display screen is 2:4 as shown in FIG. 9 and the aspect ratio of the camera image is 2:2 as shown in FIG. 10 the adaptation block is arranged to add black areas 901 and 902 to the entire encoded image 903 such that the aspect ratio of the entire encoded image is 2:4.

In step S35 if it is determined that the aspect ratio of the image received from the video camera is equivalent to the aspect ratio of the display area the image is not adapted by the encoder.

In this case the image may be displayed at the second terminal with the correct aspect ratio without the need for the receiving circuitry in the second terminal to apply further image processing steps. This is particularly advantageous where the receiving circuitry in the receiving terminal is not capable of adapting the aspect ratio of the received image locally.

In an alternative embodiment of the invention the adaptation block may be arranged to adapt the image such that the image is a monochrome image in response to receiving display information indicating that the image will be displayed in monochrome.

According to a further embodiment of the invention the image input system comprises a screen sharing module. The screen sharing module is arranged to capture as image data the image displayed on display screen 203 at the first user terminal. The image data captured from the screen may then be transmitted to the second user terminal in accordance with any of the methods described above.

Display information may be reported from the second terminal explicitly, for example as an absolute value or a range. However display information may also be reported implicitly, for example the second terminal may report a device identity or software version identity from which the first terminal can derive information relating to the display 203' at the second terminal. In this case information relating to how the image data should be adapted for the display at the second terminal is pre-stored in a local memory of the first terminal.

In an alternative embodiment of the invention the adaptation block 908 may form part of the encoder.

In embodiments of the present invention the required processing may be implemented as hardware or by using appropriately adapted software executed on a processor. Software for implementing the invention may be stored on and provided by means of a carrier medium such as a carrier disc, card or tape, A possibility is to download the software via a network such as the Internet. This is an implementation preference.

While this invention has been particularly shown and described with reference to preferred embodiments, it will be understood to those skilled in the art that various changes in form and detail may be made without departing from the scope of the invention as defined in the claims.

The invention claimed is:

1. A method comprising:
   receiving image data, by an image input system at a first device, as part of a communication event between the first device and a second device;
   receiving, at the first device, display characteristics associated with the second device including a portion of the image data displayed in a window at the second device, a proportion comprising an amount of the image data displayed in the window, and dimensions of the window;
   determining, at the first device, a magnification applied to the portion of the image data based on the proportion and the dimensions of the window;
   determining, at the first device, a first resolution for encoding the portion of the image data based on the determined magnification;
   determining, at the first device, a second resolution for encoding another portion of the image data not displayed within the window;
   encoding, at the first device for transmission to the second device, the portion of the image data displayed within the window at the first resolution and the other portion of the image data not displayed within the window at the second resolution; and
   transmitting, at the first device, the encoded image data including transmitting the portion of the image data displayed in the window at the first resolution along with the other portion of the image data that is not displayed in the window at the second resolution for receipt by the second device to cause optimization of display of the portion of the image data at the second device and as part of the communication event.

2. The method of claim 1, wherein the display characteristics further comprise one or more of:
   a colour depth of the display;
   a capacity to represent light nuances on the display;
   a screen depth of the display.

3. The method of claim 1 wherein said adapting further comprises determining an encoding parameter for encoding the portion of the image data based at least in part on one or more of the display characteristics.

4. The method of claim 3 wherein the encoding parameter comprises one or more of:
   a level of colour information;
   a level of light information;
   a resolution value;
   an aspect ratio;
   a frame rate;
   a compression complexity of the adapted image; or
   a bit rate.

5. The method of claim 3 further comprising determining the encoding parameter according to a function of one or more of the display characteristics.

6. The method of claim 3 wherein determining the encoding parameter comprises:
   querying a look up table with one or more of the display characteristics; and
   retrieving the encoding parameter based at least in part on one or more of the display characteristics.

7. The method of claim 1, wherein the communication event is a video call, the image data includes video data of a user of the first device, and said adapting is performed during the video call.

8. The method of claim 7, wherein said receiving the display characteristics further comprises receiving video data of the video call from the second device.

9. The method of claim 1, wherein said encoding is updated with new respective first and second resolutions in response to receiving an update to one or more of the display characteristics.

10. The method of claim 9, wherein the first device receives an updated portion of the image data and an updated proportion received responsive to a zoom operation to the portion of the image data at the second device.

11. The method of claim 1 wherein said encoding the portion of the image data achieves an acceptable level of perceived quality for the portion of the image data.

12. A method comprising:
    receiving, by an input system at a first device, image data as part of a communication event between the first device and a second device;
    receiving, at the first device, display characteristics associated with the second device including a portion of the image data displayed in a window at the second device, a proportion comprising an amount of the image data displayed in the window, and dimensions of the window;
    determining, at the first device, a magnification applied to the portion of the image data based on the proportion and the dimensions of the window;
    adapting, at the first device, the image data to generate adapted image data comprising the portion of the image data that is encoded at a first resolution determined based on the magnification and another portion of the image data that is not displayed within the window that is encoded at a second resolution; and
    transmitting, at the first device, the adapted image data for receipt by the second device including transmitting the portion of the image data at the first resolution along with the other portion of the image data at the second resolution to cause optimization of display of the portion of the image data at the second device and as part of the communication event.

13. The method of claim 12 wherein the image data includes images of a user of the first device input from a camera.

14. The method of claim 12 wherein the image data is screen sharing data.

15. The method of claim 12, wherein the adapting is updated with new first and second resolutions for encoding in response to receiving an update to the portion of the image data displayed in the window and an update to the proportion from the second device, the updates occurring responsive to a zoom operation at the second device.

16. A transmitting device comprising:
a receiver for receiving display characteristics associated with a receiving device; and
one or more processors configured to execute instructions stored on the transmitting device to perform operations including:
receiving the image data as part of a communication event between the transmitting device and the receiving device;
receiving the display characteristics that include a portion of image data displayed in a window at the receiving device, a proportion comprising an amount of the image data displayed in the window, and a window size of the window;
determining a magnification applied to the portion of the image data based on the proportion and the dimensions of the window;
determining a first resolution for encoding the portion of the image data based upon the determined magnification;
determining a second resolution for encoding another portion of the image data that is not displayed within the window;
adapting the portion of the image data and the other portion of the image data for transmission to the receiving device including encoding the portion of the image data displayed at the receiving device at the first resolution and the other portion of the image data that is not displayed at the receiving device at the second resolution; and
transmitting circuitry for transmitting the adapted portion of the image data at the first resolution along with the adapted other portion of the image data at the second resolution for receipt by the receiving device to cause optimization of display of the portion of the image data at the receiving device and as part of the communication event.

17. The transmitting device of claim 16, wherein the transmitting device comprises: an end user node, a server relaying image data from an end user node, or a server distributing pre-stored image data.

18. A receiving device comprising:
a display for displaying a portion of image data received from a transmitting device as part of a communication event between the transmitting device and the receiving device;
one or more processors configured to execute instructions stored on the receiving device to perform operations including:

determining display characteristics including the portion of the image data displayed in a window at the receiving device, a proportion comprising an amount of the received image data displayed in the window, and dimensions of the window; and
generating a report that includes the display characteristics including the proportion and window size; and
a transmitter for transmitting the report to the transmitting device to enable the transmitting device to encode the portion of the image data displayed within the window at a first resolution based at least in part on the display characteristics and encode another portion of the image data that is not displayed within the window at a second resolution for transmission to the receiving device to cause optimization of display of the portion of the image data at the receiving device and as part of the communication event.

19. The receiving device of claim 18, wherein the operations further comprise:
receiving a zoom input;
updating the portion of the image data displayed within the window, updating the other portion of the image data that is not displayed within the window, and updating the proportion according to the zoom input; and
generating an updated report that includes the updated portion of the image data, the updated other portion of the image data, and the updated proportion; and
wherein the transmitter transmits the updated report to the transmitting device to enable the transmitting device to encode the updated portion of the image data displayed within the window at an updated first resolution determined by the updated report along with the updated other portion of the image data that is not displayed within the window at an updated second resolution.

20. A computer program product comprising program code stored on a hardware computer readable storage memory, the program code being executable by one or more processors to cause the one or more processors to perform operations including:
receiving, by an input system, image data as part of a communication event with a second device;
receiving display characteristics associated with the second device including a portion of the image data displayed in a window at the second device, a proportion comprising an amount of the image data displayed in the window, and dimensions of the window;
determining a magnification applied to the portion of the image data based on the proportion and the dimensions of the window;
adapting the image data based at least in part on the display characteristics to generate adapted image data including encoding the portion of the image data displayed in the window at a first resolution determined based on the magnification and encoding another portion of the image data that is not displayed in the window at a second resolution; and
transmitting the adapted image data including both the portion of the image data at the first resolution and the other portion of the image data at the second resolution for receipt by the second device to cause optimization of display of the portion of the image data at the second device and as part of the communication event.

* * * * *